United States Patent [19]

Angermeier

[11] Patent Number: 4,894,249

[45] Date of Patent: Jan. 16, 1990

[54] CURING PROCESS FOR MEATS

[75] Inventor: Herbert F. Angermeier, Essex Falls, N.J.

[73] Assignee: Liberty Provisions, Inc., Clifton, N.J.

[21] Appl. No.: 322,367

[22] Filed: Mar. 13, 1989

[51] Int. Cl.$^4$ .............................................. A23B 4/02
[52] U.S. Cl. ................................ 426/264; 426/332; 426/641; 426/649; 426/652
[58] Field of Search ............... 426/264, 281, 641, 649, 426/652, 332, 804

[56] References Cited

U.S. PATENT DOCUMENTS

| | | | |
|---|---|---|---|
| 2,471,144 | 5/1949 | Davy | 426/649 |
| 2,806,793 | 9/1957 | Kemps | 426/652 X |
| 2,966,416 | 12/1960 | Kossoy et al. | 426/652 X |
| 3,028,246 | 4/1962 | Oliver et al. | 426/652 X |
| 3,447,932 | 6/1969 | Olson et al. | 426/646 |
| 3,860,732 | 1/1975 | Eisenstadt | 426/649 |

FOREIGN PATENT DOCUMENTS 8809131 12/1988 PCT Int'l Appl. ................ 426/649

*Primary Examiner*—Arthur L. Corbin
*Attorney, Agent, or Firm*—Lerner, David, Littenberg, Krumholz & Mentlik

[57] ABSTRACT

A method for curing primal cuts of meats to provide a substantially sodium-free meat product including the steps of forming a curing composition comprising ammonium chloride, ammonium phosphate, and potassium phosphate in the ratio by weight of 10:4:2.75, for maintaining the curing composition at a pH in a range from 6.3 to 7.0, and injecting or mixing said curing composition into said primal cuts of meats in a range from 22% to 26% by weight of the weight of the primal cuts of meat being treated.

Specific curing compositions are also provided for use with the method of the present invention.

13 Claims, No Drawings

CURING PROCESS FOR MEATS

BACKGROUND OF THE INVENTION

This invention relates to the curing of primal cuts of meat and, more particularly, to the use of ammonium chloride, ammonium phosphates, and potassium phosphates in the curing of primal cuts of meat, so that the finished product offered in the commercial marketplace can be classified as a non-sodium added product.

The term "primal cuts", as used herein, refers to definitions promulgated by the American Meat Institute and is deemed when used herein to include, fresh or green cuts of ham, bacon, pork, corned beef, pastrami and other meats to be cured.

It is well known that in the curing of green or fresh cuts of meat, more particularly ham, or in the curing of sausage type meat products that various types of brine or pickling solutions are used in which the basic ingredients are sodium salts such as sodium chloride, sodium nitrite, sodium phosphate and the like type of sodium salts. These prior art brine or pickling solutions have controlled ingredients so that the finished product produced comes within the strict U.S. Government Standards and Regulations for these finished hams, bacon, pork, corned beef, pastrami and other cured meat products.

These U.S. Government Standards impose limitations as to the additives present in the final meat product, derived from curing compositions used, such that the salts of ascorbic acid, vitamin C, does not exceed ⅞ of 1 oz.; the nitrites cannot exceed 200 ppm, and the phosphates cannot exceed 0.5 of 1% per 100 lbs. of finished meat products.

Various curing compositions have been developed and used in the prior art to provide finished ham, sausage, and other meat products which fall within these standards and, more recently, curing compositions have been developed to provide finished ham, sausage, and other meat products which can be further classified as either no sodium added products, or low-sodium products. These last mentioned products are so classified when the finished meat product has sodium salts present in an amount not greater, or only slightly greater, than the original sodium salt content of the fresh or green meat product before it was subjected to the curing process.

It is obvious that such no sodium added, or low-sodium meat products are valuable because they can be used beneficially in a normal diet and also by persons that require low-sodium meat that have a cardiac condition, edematous condition, or are obese.

The prior art shows that efforts have been made to provide such no sodium added, or low-sodium meat products by utilizing various curing compositions as is set forth in U.S. Pat. Nos. 3,447,932; 3,782,925; and 4,113,885.

U.S. Pat No. 3,447,932, discloses a solid curing composition consisting of potassium polyphosphates and potassium pyrophosphates in combination with limited amounts of potassium chloride used for the manufacture of dietetic sausage in meat loaf products.

In U.S. Pat. No '932 it is made clear that while a curing solution made of potassium chloride functions like the prior art's sodium chloride solutions, it must be carefully controlled otherwise the cured meat product will have a bitter and unpalatable taste and lack the desired texture and appearance. This problem is overcome by the disclosed composition in U.S. Patent '932 by combining the potassium salts of polyphosphates and pyrophosphates so that a reduced concentration of the potassium chloride that is needed can be used.

U.S. Pat. No. 3,782,975 discloses an aqueous curing solution for primal cuts of meat which is free of sodium and chloride ions consisting of a water soluble, non-toxic potassium phosphate composition formulated with potassium nitrite, potassium nitrate, potassium ascorbate, sugar, and condiments.

U.S. Pat. No. 4,113,885 discloses compositions providing low-sodium meat products in which the curing agent utilized is a nitrite selected from the group consisting of potassium nitrite, ammonium nitrite, nitrous acid, and mixtures thereof.

It will be noted that these prior art patents seek to achieve the desired reduction of sodium in the finished meat product by combinations of potassium salts. Potassium is one of the ions that can be substituted in place of the sodium ion for this purpose. Potassium salts present a major problem because in the curing of meat the object is not only to preserve the meat but also to establish a pleasant taste and to preserve the natural color, texture and appearance of the finished meat product. However, potassium salts, more particularly, potassium chlorides, are so strong and acrid that even small quantities may produce an off-flavor in the finished meat product.

Since chloride ion is necessary to the curing of meat because it gives the finished meat product its desirable taste; Applicant considered using other chloride salts in his curing composition such as ammonium chloride, however, because chloride salts are acidic they must be alkalinized by other ingredients in the curing composition in order to provide the composition with a relatively neutral pH which will additionally assure that the cured meat has the proper taste, texture, appearance and color.

This is accomplished in the present invention by establishing a curing composition in which the pH is controlled by combining the ammonium chloride with controlled quantities of ammonium phosphate and potassium phosphate as is hereinafter more fully illustrated.

In the present invention the ammonium chloride in the curing composition provides the chloride for achieving the desired flavor and taste in the meat being cured. However, because ammonium chloride produces an acid pH condition in solutions this acid pH condition must be balanced to prevent the emulsion formed during the curing process from breaking down. To achieve this pH balance the ammonium phosphates and potassium phosphate components in the curing solution are adjusted relative to each other and to the concentration of the ammonium chloride in the curing composition to provide the necessary and desirable pH for achieving proper curing of the fresh or green cuts of the meat being treated.

A pH in the curing composition in a range from 6.3 to 7.0 will produce a stable emulsion during the curing composition. In this range the phosphates bind the protein in the meat, and the chloride helps retain moisture in the bound protein portion of the meat being treated and further helps to flavor the meat so it will have the proper taste and texture.

Applicant has no knowledge of any disclosures in the prior art of curing compositions that can be substituted in place of prior art curing solutions using sodium salts which include, in combination, ammonium chloride, ammonium phosphates, and potassium phosphates for achieving the advantageous results of the present invention.

SUMMARY OF THE INVENTION

Thus, the present invention covers a method for curing fresh primal cuts of meat to provide a substantially sodium-free meat product including, the step of forming a curing composition of about 22%–26% by weight of said primal cuts, and most preferably 22% by weight. In the formation of this curing composition, an ammonium phosphate such as di-ammonium phosphate $((NH_4)_2PO_4)$, a potassium phosphate such as tri-potassium phosphate $(K_3PO_4)$, and ammonium chloride $(NH_4Cl)$ are mixed together along with spices and other known ingredients to form the curing composition and injected or mixed into said primal cuts of meat for curing. The ammonium phosphate and potassium phosphate in controlled quantities are used for adjusting the pH of the curing composition in a range from 6.3 to 7.0 and preferably in the range of 6.6 to 6.7 and most preferably to achieve a pH of 6.6. The curing composition can be either in solution or a solid form as a function of the Application i.e., the curing of meats such as hams, in which the curing composition is in solution form or of sausage meats where the curing composition is in solid form.

The curing composition includes the active ingredients in the following proportions: ammonium chloride (10) to ammonium phosphate (4.0) to potassium phosphate 2.75, a ratio of 10:4:2.75 of the total weight of the curing composition which in turn is a function of the weight of the primal, fresh or green cuts of meat being treated. Temperature and pressure conditions are standard in the art and are particularly applicable to this curing solution. Therefor, the curing composition in accordance with the present invention is usable in existing equipment and procedures as will be understood by those skilled in the art.

DETAILED DESCRIPTION

The curing solutions in accordance with the present invention similar to the making of curing solutions in the prior art are made by dissolving spices, flavoring, other sodium-free additives, along with the active ingredients consisting of various forms and percentages by weight of potassium phosphates, ammonium phosphates, and ammonium chloride in an aqueous solution in which the primal cuts or cuts of meat will be cured.

Those skilled in the art will readily understand that the use of the curing solution in accordance with the present invention serves to modify and replace the curing compositions heretofore used in the initial curing step for the conventional processing of primal cuts of meat which heretofore used brine solutions in which the active ingredient for achieving the desired treating of the primal cuts of meat are sodium salts, generally sodium chlorides, sodium nitrites, sodium phosphates, and the like.

This curing solution in accordance with the present invention is injected into the primal cuts of meat being treated either by arterial pumping through the vascular system using for example the femoral artery or by stitch pumping in which the curing solution is pumped directly into the cuts of meat by a large number of closely spaced hollow needles so the curing solution is spread uniformly through the tissues of the primal, fresh or green cuts of the meat being treated.

DESCRIPTION OF THE ACTIVE INGREDIENTS

The potassium phosphates employed herein include tri-potassium phosphate, potassium pyrophosphate, and mixtures thereof.

The concentration of potassium phosphate in the curing composition is generally in the range of about $\frac{1}{8}$% to $\frac{1}{4}$% by weight per 100 lbs. of meat being cured. The concentration of potassium phosphate and ammonium phosphate is about $\frac{1}{2}$% by weight per 100 lbs. of meat being cured. The concentration of the ammonium phosphate in the aqueous curing solution and the solid curing composition is generally in the range of $\frac{1}{4}$% to $1\frac{1}{2}$% by weight per 100 lbs. of meat being cured. The concentration of the ammonium chloride in the aqueous curing solution and the solid curing composition is generally in the range of about $\frac{1}{2}$% to 2% by weight per 100 lbs. of meat being cured and preferably in the range of about $\frac{1}{2}$% to 1% by weight per 100 lbs. of meat.

The meat should be phosphated to not more than 0.5 of 1% of its green weight. The phosphate used is primarily di-basic ammonium phosphate with enough tri-potassium potassium phosphate to control the pH of the finished product between 6.3 and 7.0.

Sugar may be included in the curing composition in an amount of about 1% to 3% by weight per 100 lbs. of meat being cured to impart a delicate taste to the cured product and will provide superior color. The amount of sugar is not critical, but it relieves the bland taste and covers the undesirable taste of the phosphates which becomes noticeable for some individuals at the $\frac{1}{4}$% to $\frac{1}{2}$% per 100 lbs. of meat in the retained phosphate level of the finished product.

The curing solution at 34° F.–50° F. and preferably not more than 45° F. and most preferably at 40° F. is injected into hams by arterial and stitch pumping, and into bacon by stitch pumping in an amount corresponding to about 22% to 26% of the weight of the primal cuts. The primal cuts during the pumping step are kept at a temperature between about 40° F. to 45° F. Following the pumping step, the primal cuts are massaged, refrigerated, and further processed by heating or heating and smoking in accordance with procedures well known in the art. The internal temperatures during the steps of the curing process must reach the minimum prescribed by U.S.D.A. Standards.

Without further elaboration, it is believed that one skilled in the art can, using the preceding description, utilize the present invention to its fullest extent. The following preferred, specific embodiments are, therefore, to be construed as merely illustrative and not intended to limit the remainder of the disclosure in any way whatsoever.

In the following examples, all temperatures are set forth in degrees Fahrenheit; unless otherwise indicated, all parts and percentages are by weight.

EXAMPLE I

A combination of materials to form an aqueous curing solution was prepared having the following composition:

50 gallons of water;
8 lbs. of di-ammonium phosphate;
5½ lbs. of tri-potassium phosphate;
20 lbs. of ammonium chloride;
8 lbs. of pork protein;
9¼ lbs. of cure;
5¼ lbs. of flavor;

4 oz. cardamom;
1 qt. of ham flavor; and
60 lbs. of sugar

The curing solution is prepared by first mixing the di-ammonium phosphate and tri-potassium phosphate in a tank with the water at a temperature of 40° F. to 45° F. It is necessary to first dissolve the phosphates before adding the ammonium chloride. Otherwise the solution of the phosphate will be inhibited and they will not dissolve.

After the phosphates are dissolved then ammonium chloride is next added to the mixture with agitation and thereafter the remaining ingredients were added to provide the desired curing solution for the meat product to be cured.

Now one hundred pounds of primal, fresh or green cuts of ham are placed on a suitable type of conveyor belt and the curing solution is injected by any suitable type of pumping and the ham is dropped into a vat and weighted. The weight of the ham plus the mixture of injected curing solution is adjusted either by adding or removing curing solution until the weight of the combination of meat and curing solution is one hundred twenty-two pounds (122 lbs.), thus providing the 22% by weight of curing composition to the weight of the meat being cured.

Thereafter, the ham is massaged and the same steps for making a finished and cooked ham following as has heretofore been used in the prior art curing processes. The finished meat product is stored and refrigerated until it is shipped to the commercial marketplace.

The finished and cured ham products obtained using the curing composition as above described in this sodium, met all the required limitations of the U.S. Government Standards and provided an improved cured ham product having the proper taste, texture, appearance and color.

EXAMPLE II

A combination of materials to form an aqueous curing solution was prepared having the following composition.
25 gallons of water;
4 lbs. of di-ammonium phosphate;
2¾ lbs. of tri-potassium phosphate;
10 lbs. of ammonium chloride;
40 lbs. of sugar;
4 lbs. of pork protein;
1⅓ bags of cure;
1⅓ bags of flavor; and
1 pt. of ham flavor This curing solution was prepared by first mixing the di-ammonium phosphate and tri-potassium phosphate in a tank with the water at 40° F. to 45° F., until the phosphates are fully dissolved before adding the ammonium chloride because ammonium chloride inhibits dissolution of the phosphates.

After the phosphates were dissolved the ammonium chloride was added to the mixture with agitation. Thereafter the remaining ingredients were added to provide this form of curing composition.

Two hundred fifty pounds of primal, fresh or green cuts of ham were placed on a suitable conveyor belt and the steps of injecting and weighing were followed in the same manner above described in Example I until the curing composition was in a ratio of 22% by weight of the total weight of the meat being cured and the meat was then processed using the same steps heretofore used in the prior art curing process until a cooked finished product was obtained and stored under proper refrigerated conditions until it is shipped to the commercial marketplace.

The finished and cured ham products obtained using the curing composition as above described in this example when tested showed no quantities of added sodium, met all the required limitations of the U.S. Government Standards, and provided an improved cured ham product having the proper taste, texture, appearance and color.

EXAMPLE III

A combination of materials for curing two hundred fifty pounds (250 lbs.) of sausage meat was used as follows:
8 lbs. of non-fat milk;
1 lb. of ammonium phosphate;
4 oz. of potassium phosphate;
2 lbs. of ammonium chloride;
3 lbs. of onions;
12 oz. of garlic;
4 oz. of oregano;
6 oz. of pepper;
4 oz. of smoked flavoring;
1 bag of spice;
10 oz. of cure; and
70 lbs. of water The two hundred fifty pounds of sausage meat was cut in small pieces and placed into a chopper for 5 to 7 minutes at a temperature of about 38° F. The ammonium phosphate and potassium phosphate were then sprinkled evenly over the meat. The phosphates must be added before the ammonium chloride in order to bind the protein in the sausage meat being cured. The meat is chopped once again for a few minutes and then the ammonium chloride, spices and other ingredients are added to the chopper until all the ingredients are thoroughly mixed.

Once the combined meat and curing composition have been thoroughly chopped and mixed, the combined mixture is passed into a emulsifier for about one and one-half minutes to form a smooth emulsion.

Thereafter, the cured sausage follows the same steps and procedures heretofore used including, stuffing the emulsified meat into a casing, smoking the stuffed casing in a smoke house for about five (5) hours and then cooking and storing the finished and cooked cured product for shipment to the commercial marketplace, as will be understood by those skilled in the art.

The finished sausage product which was cured using the curing composition as above described when tested showed no quantities of added sodium, met all the required limitations of the U.S. Government Standards, and provided a cured sausage meat having the proper taste, texture, appearance and color.

The test results on a veal sausage meat processed with the curing composition as set forth in Example III when tested in accordance with methods promulgated by the U.S.D.A. provided the following results.

Sample Identification:

Veal Franks - no salt added - Level 1 - Sample
4th Quarter - 23177
Findings:

| MG/100 G. | MG/2 OZ. SERVING |

| | | |
|---|---|---|
| -continued | | |
| Sodium | 139.62 | 79.17 |

This quantity of sodium is average for the fresh or green cuts of such veal sausage meats and therefor the processing with the curing composition in accordance with the present invention did not add or increase the sodium content of the finished product.

The preceding examples can be repeated with similar success by substituting the generically or specifically described reactants and/or operating conditions of this invention for those used in the preceding examples.

The ratios, proportions, and percentages of the disclosed ingredients provide finished meat products which meet all U.S. Government Regulations for cured meats. These ratios in the curing compositions in accordance with the present invention can be varied to meet the Government Standards for other countries of the world without departing from the spirit and scope of the present invention.

From the foregoing description, one skilled in the art can easily ascertain the essential characteristics of this invention and, without departing from the spirit and scope thereof, can make various changes and modifications of the invention to adapt it to various usages and conditions.

I claim:

1. A method for curing fresh primal cuts of meat to provide a substantially sodium-free product including the steps of:
   a. forming a curing composition consisting of ammonium chloride, ammonium phosphate, and potassium phosphate, and
   b. treating the meat with said curing composition as a function of the weight of the meat being treated to provide the desired meat product.

2. The method for curing fresh primal cuts of meat according to claim 1 wherein said ammonium chloride, said ammonium phosphate, and said potassium phosphate is in the ratio of 10:4:2.75.

3. The method for curing fresh primal cuts of meat according to claim 1 or 2 wherein the curing composition has a pH from 6.6 to about 7.0.

4. The method for curing fresh primal cuts of meat according to claim 2 wherein said curing composition is in a range from about 22% to 26% by weight of said primal cuts.

5. The method for curing fresh primal cuts of meat according to claim 1 wherein the ammonium chloride is in a range from 0.5% to 2.0% by weight of said primal cuts.

6. The method for curing fresh primal cuts of meat according to claim 1 wherein the ammonium phosphate is in a range from 0.25% to 1.5% by weight of the curing composition.

7. The method of curing fresh primal cuts of meat according to claim 1 wherein the potassium phosphate is in a range from 0.125% to 0.25% by weight of the curing composition.

8. The method for curing fresh primal cuts of meat according to claim 1 wherein the ammonium phosphate used in said curing composition is di-ammonium phosphate.

9. The method according to claim 8 wherein the curing composition is injected into said primal cuts of meat.

10. The method according to claim 1 wherein said curing composition is in the form of a solution.

11. The method for curing fresh primal cuts of meat according to claim 10 wherein the treating step is performed by mixing said curing composition directly with the fresh cuts of meat, and kneading the mixture to provide uniform distribution of the curing composition in the meat being treated.

12. The method according to claim 1 wherein said curing composition is a dry formulation.

13. The method for curing fresh primal cuts of meat according to claim 1 wherein the potassium phosphate is selected from the group consisting of tri-potassium phosphate, pyropotassium phosphate and mixtures thereof.

* * * * *

UNITED STATES PATENT AND TRADEMARK OFFICE
CERTIFICATE OF CORRECTION

PATENT NO. : 4,894,249

DATED : January 16, 1990

INVENTOR(S) : Herbert F. Angermeier

It is certified that error appears in the above-identified patent and that said Letters Patent is hereby corrected as shown below:

Column 4, line 23, cancel the word "potassium" (second occurrence).
Column 5, line 33, after "in this" insert --example when tested showed no quantities of added--.

Signed and Sealed this

Twenty-eighth Day of April, 1992

Attest:

HARRY F. MANBECK, JR.

Attesting Officer

Commissioner of Patents and Trademarks